No. 648,537. Patented May 1, 1900.
J. G. SORUP.
VEHICLE TIRE.
(Application filed Mar. 26, 1900.)
(No Model.)
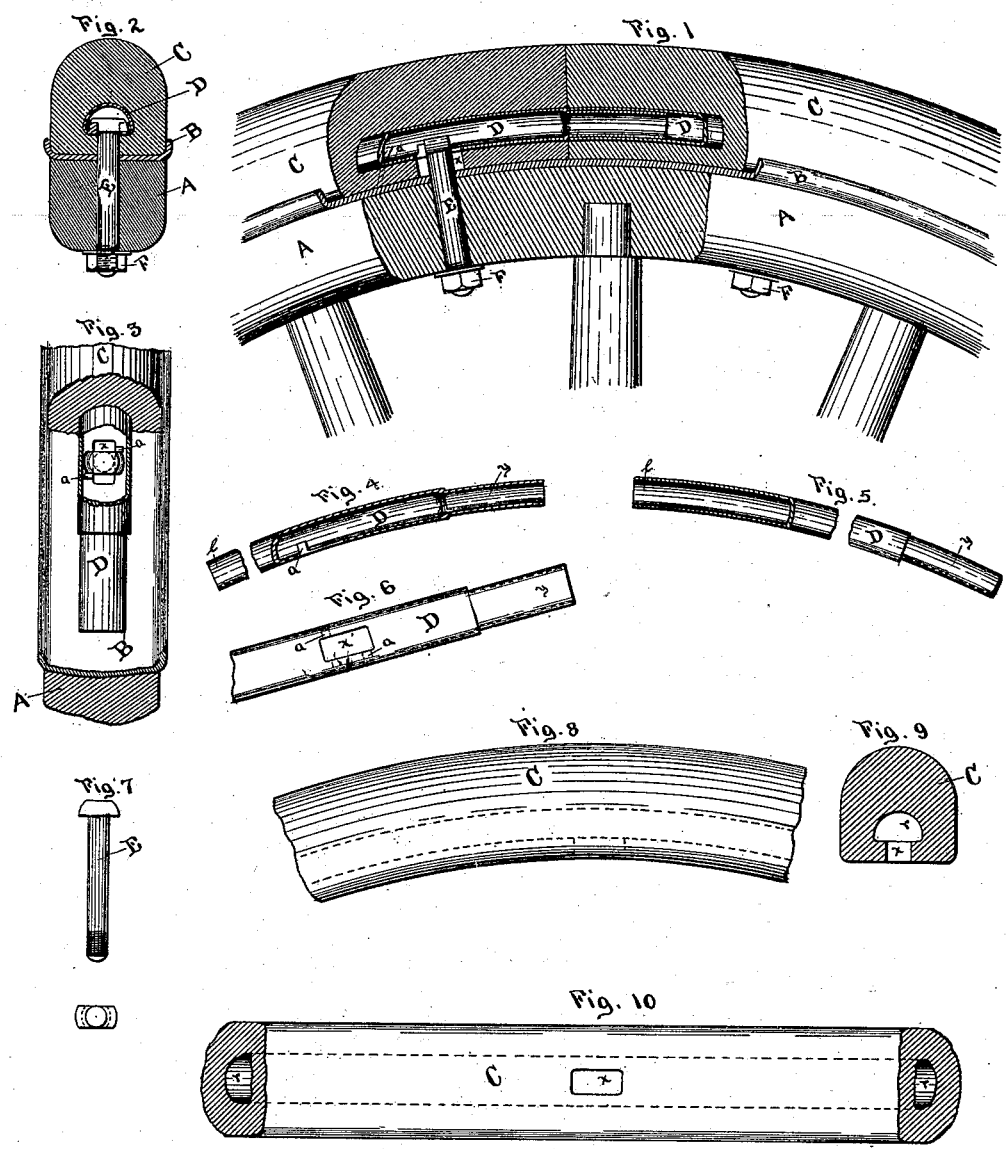
WITNESSES:
Ellis C. Montague
Chas. Herrmann, Jr.
INVENTOR
John G. Sorup
BY James H. Platt,
ATTORNEY.

United States Patent Office.

JOHN G. SORUP, OF TIFFIN, OHIO.

VEHICLE-TIRE.

SPECIFICATION forming part of Letters Patent No. 648,537, dated May 1, 1900.

Application filed March 26, 1900. Serial No. 10,233. (No model.)

*To all whom it may concern:*

Be it known that I, JOHN G. SORUP, a citizen of the United States, residing at Tiffin, in the county of Seneca and State of Ohio, have invented a new and useful Improvement in Vehicle-Tires, of which the following is a full, clear, and exact description.

The object of my invention is to provide a means of securing a rubber tire to a vehicle-wheel by a series of metal peripheral clamps and bolts and so constructed that in event of accident to the tire it may be quickly removed and the injured portion replaced with a new section of rubber, thus saving the greater portion of the tire. I attain this object by the mechanism illustrated in the accompanying drawings, in which—

Figure 1 is a vertical section of part of a wheel, showing the means of fastening the rubber tire to the rim of the wheel and the connection of two of the peripheral clamps. Fig. 2 is a cross-section of the wood felly, the steel rim, and rubber, showing the peripheral clamp and bolt. Fig. 3 is a plan view of part of the wheel with part of the rubber tire cut away to show the peripheral clamp and bolt. Fig. 4 is a partial side view of one of the peripheral clamps with part of the side cut away to show the internal lugs placed there to prevent the clamp-bolt from turning. Fig. 5 is another partial side view of one of the peripheral clamps. Fig. 6 is a bottom view of one of the peripheral clamps. Fig. 7 shows the clamp-bolts. Fig. 8 is a partial side elevation of the rubber tire. Fig. 9 is a cross-section of the rubber tire, and Fig. 10 is an inverted plan view of the tire.

Similar letters refer to similar parts throughout the several views.

The rubber tire C is made of two or more sections having a longitudinal cored hole $r$ running through them slightly below the center for the reception of the peripheral clamps D and three or more rectangular cored openings $x$ through the bottom into the longitudinal cored hole $r$ to allow the clamp-bolts E to be inserted into the peripheral clamps D. The peripheral clamps D are made in two or more sections to correspond with the tire C, having one end $y$ reduced so as to be inserted into the large end $l$ of the next clamp, as shown in Fig. 1. Thus when the clamps D are joined together by having their male ends $y$ inserted into the female ends $l$ they form a perfect circular or peripheral clamp inside the entire rubber tire C.

In the bottom of the peripheral clamps D are three or more rectangular openings $x'$, corresponding with the rectangular cored holes $x$ in the bottom of the rubber tire C for the admission of the clamp-bolts E and so constructed that the rectangular head of the bolt E, which is reduced on two opposite sides to the diameter of the bolt, can be inserted, and when given a quarter-turn the projecting portion of the rectangular bolt-head will be brought to bear upon the inside of the peripheral clamps D, thus clamping the rubber tire C securely to the wheel.

Projecting lugs $a$ $a$ upon the inside of the peripheral clamps D and located at opposite sides of the rectangular opening $x'$ are to prevent the rectangular head of bolt E from turning when nut F is being screwed up to clamp the tire securely to the rim.

In the construction of this tire I take two or more sections of the rubber tire C, with cored holes $r$ and $x$, as described above, and insert into the cored hole $r$ of each section of rubber C a corresponding section of the peripheral clamps D, bringing the female end $l$ of the peripheral clamp D flush with one end of the section of rubber C and allowing only the male end $y$ of the peripheral clamp D to project from the other end of the section of rubber C. Then by placing the several sections of the rubber tire C, with their peripheral clamps D, around the rim B on felly A of the wheel and inserting the male ends $y$ of the peripheral clamps D into the female ends $l$ I have a continuous rubber tire practically solid. I next take the clamp-bolts E, which have previously been placed through the rim B and felly A of the wheel, and raise their rectangular heads up through the rectangular hole $x$ in the rubber tire C and rectangular hole $x'$ in peripheral clamps D and give them a quarter-turn, bringing the projecting portions of the head over the bottom of the peripheral clamps D at the sides of rectangular hole $x'$ and in contact with projecting lugs $a$ $a$, which prevent the bolt from turning when nut F is being screwed up. I now screw up nuts F on clamp-bolts E, which draws the peripheral clamp D down tightly upon the bottom of the tire C, thus securely holding the sections of the rubber tire C to the rim. By this contruction I have a tire that is securely held to the rim, but in case of accident can be quickly and easily removed, repaired, and replaced.

Having thus described my invention, I claim as new and desire to secure by Letters Patent—

1. The combination, with the rim of a vehicle-wheel, of a rubber tire made in sections, peripheral or circular clamps holding the sections of rubber closely together and securely to the rim; the said peripheral or circular clamps having male and female ends for the purpose of joining them together and upon their inner surface at regular intervals a series of rectangular holes with internal lugs adjoining; bolts passing through the felly, rim and bottom portion of the rubber tire having a rectangular head inserted into said rectangular holes engaging said internal lugs substantially as shown and described.

2. In combination with the wheel of a vehicle provided with a metallic channeled rim, of a tire consisting of several sections of rubber provided with a hole molded longitudinally from end to end and upon their inner or bottom surface at regular intervals, a series of rectangular holes intersecting with the longitudinal hole, a tubular peripheral or circular clamp consisting of several sections inserted into the longitudinal molded hole and corresponding with the rubber tire; said peripheral or circular clamps having a male and female end for securing them together and provided upon their inner or bottom surface, at regular intervals, with a series of rectangular slots or holes corresponding with rectangular holes in bottom of tire; upon the inside of said tubular clamp and adjoining either side of said rectangular openings a projecting lug; a bolt passing through the felly, rim, and rectangular holes in bottom of said rubber tire and tubular clamp having a rectangular head so adjusted as to come in contact with said lugs of said tubular clamp for securing the parts together, substantially as shown and described.

JOHN G. SORUP.

Witnesses:
CHAS. HERRMANN, Jr.,
ELLIS C. MONTAGUE.